United States Patent [19]

Cervenka

[11] 4,006,591
[45] Feb. 8, 1977

[54] JET REACTION TURBINE WITH ROTATING COMBUSTOR FOR BURNING SLURRY FUELS

[75] Inventor: Kenneth G. Cervenka, Billings, Mont.

[73] Assignee: Faith Industries, Inc., Billings, Mont.

[22] Filed: Aug. 11, 1975

[21] Appl. No.: 603,883

[52] U.S. Cl. .................... 60/39.35; 60/39.46 S; 60/39.51 R; 60/39.74 R
[51] Int. Cl.² .................... F02C 3/14; F02C 3/26
[58] Field of Search ........ 60/39.35, 39.74 R, 39.65, 60/39.51 R, 46 S; 44/51

[56] References Cited
UNITED STATES PATENTS

| | | | |
|---|---|---|---|
| 1,431,225 | 10/1922 | Greenstreet | 44/51 |
| 1,887,001 | 11/1932 | Zetterberg | 60/39.35 |
| 2,489,823 | 11/1949 | Senninger | 60/39.74 R |
| 2,552,658 | 5/1951 | Ackerman | 60/39.74 R |
| 2,579,614 | 12/1951 | Ray | 60/39.65 |
| 2,736,369 | 2/1956 | Hall | 60/39.35 |
| 2,766,582 | 10/1956 | Smith | 60/39.74 R |
| 3,024,608 | 3/1962 | Carlotti | 60/39.65 |
| 3,032,988 | 5/1962 | Kleckner | 60/39.35 |
| 3,490,230 | 1/1970 | Pillsbury et al. | 60/39.65 |
| 3,514,273 | 5/1970 | Lee et al. | 44/51 |
| 3,886,732 | 6/1975 | Gamel | 60/39.35 |

*Primary Examiner*—Carlton R. Croyle
*Assistant Examiner*—Thomas I. Ross
*Attorney, Agent, or Firm*—Dowell & Dowell

[57] ABSTRACT

A reaction turbine for burning fuel in a reaction rotor having jet tubes through which the products of combustion within the rotor are discharged, the turbine having air compressor stages turning with the rotor and delivering heated compressed air into the rotor, and the turbine having a fuel injector extending into a combustion chamber within the rotor to spray fuel into the chamber where it is ignited after mixing with the compressed air, the chamber and the rotor being specially designed to burn slurry fuel without being clogged or eroded by it, and delivering high torque with a relatively low mass flow.

6 Claims, 4 Drawing Figures

JET REACTION TURBINE WITH ROTATING COMBUSTOR FOR BURNING SLURRY FUELS

FIELD OF INVENTION

This invention relates to reaction turbines of the type burning slurry fuels, and more particularly relates to improvements in the structure of the reaction rotor and its torque-developing features, in the means for injecting the slurry fuel and compressed air into the rotor and igniting it, and in the configuration of the combustion chamber in the rotor.

BACKGROUND AND PRIOR ART

Most gas turbines comprise remote gas generating means coupled to separate turbine torque producing rotors which depend upon large mass flow through the rotors to produce power. It is common for turbines of this sort to employ several compression stages with intermediate coolers, and with final heating of the inlet air such as is shown in U.S. Pats. Nos. 3,688,494 to Mevenkamp et al, and in 2,960,825 to Sampietro et al. The present turbine is of the type having a rotor into which slurry fuel is continuously injected and burned to produce expansion of combustion products through jets in the rotor to achieve rotation thereof at high speed, for instance, in a manner somewhat as shown in U.S. Pat. No. 3,736,369 to Hall. In U.S. Pat. No. 3,032,988 to Kleckner, a reaction wheel type of turbine is shown which is driven by Venturi nozzles discharging the products of combustion taking place within the turbine wheel.

The disclosure in U.S. Pat. No. 1,897,478 to Holzwarth shows a system in which a solid fuel is burned, the fuel being intermittently injected into the turbine combustion chamber at a regulated rate. U.S. Pat. No. 3,527,056 to Hoffman also shows injection of fuel through a nozzle at a regulated rate.

Attempts have been made to burn solid types of fuels injected in powdered form into impulse turbines, U.S. Pat. No. 1,897,478 (supra), but these systems have met with little success because of serious abrasion and erosion problems in the turbine area, and because of the excessive build-up of ash occurring as a product of the combustion of the solid fuels.

THE INVENTION

This invention relates to power turbines of the high pressure reaction type as distinguished from high-mass flow turbines of the axial-flow type. The present turbine employs a reaction type power rotor in which the diameter of the rotor is large as compared with its axial length and in which the rotor has a series of jet orifice tubes circumferentially disposed around its outer periphery. The turbine has a single shaft carrying not only the power rotor but also carrying several radial air compressor stages, where the air is cooled between the stages and then passed through a heat exchanger for recovering exhaust heat just before the compressed air is introduced into the reaction turbine rotor, the reaction rotor having an internally supported combustion chamber which rotates with the rotor. The frame of the turbine supports an injection nozzle for injecting the slurry fuel directly into the combustion chamber so that the heated compressed air and the fuel are axially introduced into the reaction rotor and burned therein to produce high pressure gas which is discharged through the orifice tubes, the pressure drop across the rotor being equal to the sum of the input compressed air pressure plus the pressure produced in the products of combustion as a result of burning the fuel. Thus, the present rotor has a relatively low mass flow rate but a high pressure ratio. Although the turbine can burn gases or liquid fuels, or even powdered coal, a coal-alcohol slurry is preferred, and this slurry can be augmented by introducing a fractional content of water into the fuel to increase its mass flow in an economical manner.

It is a principal object of the invention to provide a turbine of the type set forth above which is designed efficiently to burn slurry fuels containing suspended powdered components, such as finely divided coal dust. The efficiency of the system is attributable partly to the design of the rotor to optimize the combustion of the fuel therewithin and the smooth flow of the resulting gaseous components through the rotor and out through the reaction jet orifice tubes around its outer periphery. These orifice tubes can be either straight-through orifice tubes, diverging orifice tubes, or converging-diverging Venturi-type tubes which are screwed into openings passing through radially disposed steps around the outer periphery of the rotor at evenly spaced intervals. The rotor is shaped to provide a diameter which is large as compared with its axial length so as to provide more thrust because of a longer torque arm. It is possible to achieve higher velocities through the jet orifices by reducing the number of such orifices, but increasing their internal diameters so that the internal working pressure of the rotor can be kept high, this pressure being partly attributable to the air compressor stages appearing ahead of the rotor to provide a high pressure air source. Thus, the mass flow of fuel can be held down while at the same time maintaining a high thermal efficiency. Another advantage in using fewer orifice tubes having larger diameters, is that the high velocity flow of gases therethrough serves to entrain and remove ash created by combustion of the fuel, which ash tends to be centrifugally thrown outwardly from the combustion chamber in the center of the rotor toward the orifice tubes. As stated above the smooth-flow contour of the rotor minimizes the internal resistance to gas flow while at the same time flushing ash and other solid combustion products from the rotor. The outer surface of the rotor is also streamlined so as to provide a clean exterior contour, minimizing frictional and turbulance drag on the rotor as it turns within the spent exhaust gases. The rotor itself and its internal combustion chamber are made of appropriate stainless steels, while the orifice tubes through which the hot gases are discharged are made of tungsten carbide or similar erosion and heat resistant metals.

Another object of the invention is to provide an aerodynamically designed rotor whose diameter is several times as great as its length, and whose outwardly extending walls converge toward an axially short nozzle supporting ring to which they are bolted, the whole reaction rotor and combustion chamber assembly being easily disassemblable for servicing and replacement of eroded parts.

Another object of the invention is to provide a reaction turbine having an internal combustion chamber located axially within the rotor and having a fuel injector extending into the chamber from the same axial end at which the compressed air is introduced, and wherein the combustion gases exit from the combustion chamber in the opposite axial direction inside of the rotor.

The rotor is provided with a diverter against which these combustion gases impinge as they travel in the second axial direction away from the injection nozzle, this diverter being shaped to throw the gases impinging thereagainst outwardly toward the periphery of the rotor where the orifice tubes are located, and the diverter also serving to insulate the main turbine shaft and bearings from the heat of the combustion gases since the shaft lies along the axial path toward which the gases are travelling.

It is another major object of the invention to provide a combustion chamber comprising a sleeve having an improved shape and being axially located and rotatable within the reaction rotor, the slurry fuel being injected into this rotating chamber by a fuel injector at one axial end thereof and the air for burning the fuel being introduced into the same end of the chamber not only by passing around the injector and into the combustion chamber but also passing between the rotor and the combustion chamber so that it circulates outside of the chamber to cool it. Both the slurry fuel which is injected and the air which enters from the same axial direction into the combustion chamber are from sources which do not rotate, and therefore the rotation of the combustion chamber relative thereto creates a great deal of turbulence to mix the entering fuel with the air. The combustion chamber has a Venturi-shaped converging-diverging cross-section, and it is also provided with a number of air holes extending radially through the chamber in strategic places. These air holes admit more of the compressed air, and also tend to create turbulence between the compressed air the slurry fuel so as to ensure a high degree of mixing thereof. The main combustion takes place within the combustion chamber, and such ash as results therefrom is slung outwardly through the holes in the chamber where it is entrained in the air travelling axially along the outside of the chamber toward the periphery of the rotor where it is discharged outwardly through the orifice tubes. Thus, the chamber tends to be self-cleaning and relatively free from solid products of combustion which might otherwise build up therein. The Venturi-shaped chamber has a converging restriction which flares outwardly again as it discharges toward the diverter discussed in the preceding paragraph. The excess air flowing around the outside of the combustion chamber also serves to cool it and maintain its temperature within levels appropriate for the stainless steel material of which it is made.

Another major object of the invention is to provide an improved fuel injection system which cooperates with the rotating combustion chamber by injecting a continuous flow of slurry fuel axially into that chamber, the fuel burning and the products thereof exiting axially from the opposite end of the chamber. The fuel injector comprises an injection valve head directly injecting the fuel under pressure, which fuel is premixed and supplied by a fuel pump and regulator acting directly on the fuel. The injection of fuel is continuous as is also the injection of heated dense air from the two compressor stages. The fuel may be considered as a single liquid phase maintained at constant density and regulated pressure by external means at the fuel source. The fuel injector comprises an elongated hollow control rod through the center of which the slurry is fed and then discharged at the valve head end through a conical valve and valve seat comprising the injection nozzle itself. The opening through the valve head is controlled by reciprocation in the axial direction of the hollow control rod which carries the movable valve portion which cooperates with a fixed seat member comprising part of the injector housing. The slurry is injected therebetween and emerges as a finely divided spray within the combustion chamber, the fuel being sprayed outwardly in a diverging cone directly in the path of the incoming compressed air, and the contact between the two being made very turbulent by the rotation of the combustion chamber at high angular velocity about the fuel and air stream. The fuel is metered into the injection valve head by a suitable pump and external metering means, only generally illustrated since they do not comprise part of the novelty of the present invention. Reduction in the diameter of the bore through the control rod, and the conical structure of the valve at the discharge head end comprising the nozzle, prevents caking or precipitation of the fuel due to the high velocity of travel therethrough. The injection velocity of the fuel as it leaves the nozzle is controlled by balancing the size of the opening through the control valve head and the internal cross-sectional area of the control rod bore against the fuel pump pressure. This balance is achieved by an adjustable spring which urges the control rod valve toward the fixed seat member, which tends to close the nozzle against the fuel pressure within the rod which pressure tends to open the nozzle, and therefore the adjustment of the spring for a given fuel pressure controls the axial position of the control rod to provide a proper flow of fuel through the nozzle while compensating for thermal expansion and contraction of the injector parts with temperature variations.

It is another object of the invention to provide a complete turbine system, including not only a reaction rotor, but also including the necessary features of the turbine such as the compressor stages which are required to achieve high-pressure, low-mass flow operation compatible with the burning of an alcohol slurry entraining finely divided coal dust, and in which the mass flow can be conveniently altered by including water mixed with the alcohol in the slurry.

Another object of the invention is to provide a slurry fuel burning reaction turbine in which the pressure drop across the reaction rotor is maintained at a high level by the high pressure inlet air source, but wherein the power required to compress the inlet air is small because the mass flow through the rotor has been kept low. Most of the enthalpy drop occurs within the reaction rotor against the rotating member and at the jet orifice tubes.

Other objects and advantages of the invention will become apparent during the following discussion of the drawings, wherein:

THE DRAWINGS

Figure 1:
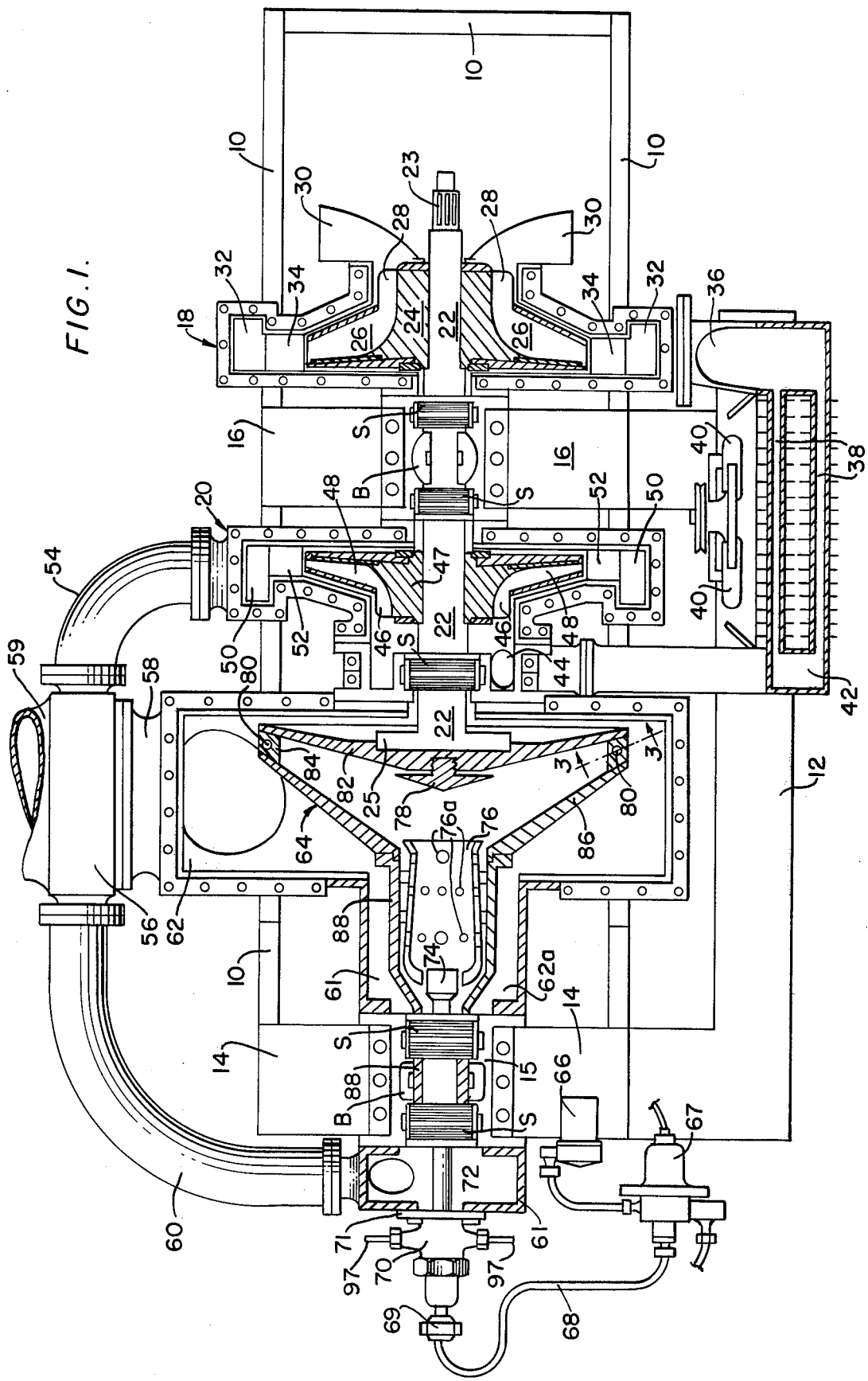
FIG. 1 is a view, partly in section showing a complete turbine according to the present invention including two radial compressor stages with appropriate heat exchangers, and driven by a reaction rotor including an internal combustion chamber and fuel injection means.
Figure 2:
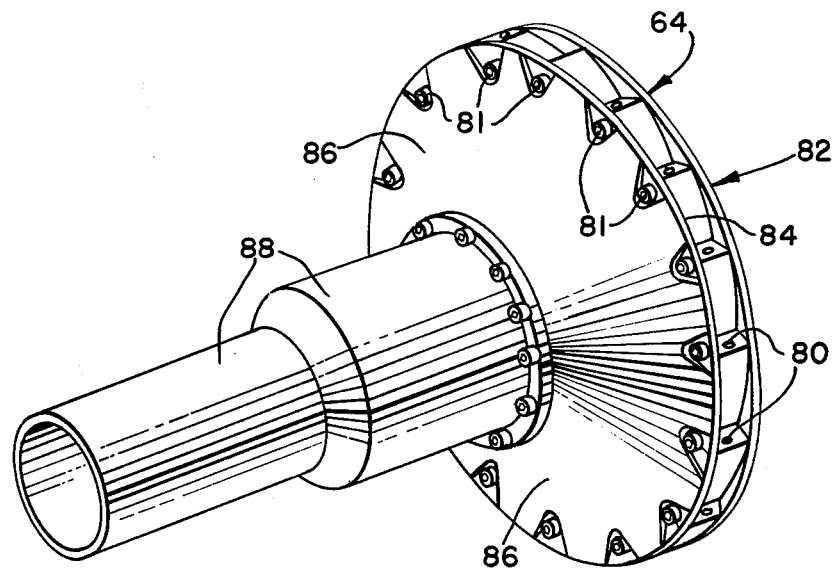
FIG. 2 is a perspective view of the outside of the reaction rotor and the shaft which supports it in the turbine.

Referring now to FIG. 1 of the drawing, this figure shows a complete turbine embodying the present invention in combination with other turbine features well known in the prior art.

The turbine includes a frame 10 which has a support portion 12 extending therefrom for supporting a heat exchanger which will be hereinafter explained. The frame also supports two pairs of upwardly extending support members 14 and 16 which support the seals S and the main bearings B on which the turbine shaft is rotated, in the manner to be discussed hereinafter. The turbine includes two radial compressors 18 and 20 which are mounted on a common shaft 22 of the turbine rotatably supported in the bearings B carried by the support members 14 and 16. The first compressor 18 has a rotating member 24 which supports an annular series of compressor blades, each of which has a radially extending blade portion 26 and an inducer portion 28 which extends parallel to the main shaft 22. Air at atmospheric pressure enters through intake ducts 30, is drawn into the inducer portions 28 and is impelled radially outwardly at high velocity by the blades 26. The velocity of the outwardly impelled air is converted by diffusers 34 into increased pressure in the collector ducts 32, and the air thus compressed then passes through the duct 36 and into a fin-tube heat exchanger 38. The compressed air is then cooled by the finned coils which have ambient air blown over their outer surfaces by the fan blades 40 rotated by drive means not shown herein. The air under increased pressure, and cooled, then passes from the heat exchanger through the duct 42 and into the second compressor stage 20 through the duct 44. Again, this air is drawn into the radial compressor rotor 47 by inducer portions 46 of compressor blades 48 which drive the air outwardly at high velocity into diffuser plates 52 within the collector ducting 50 where the air achieves a still higher pressure.

The air compressed by the second radial compressor stage 20 then passes outwardly through a duct 54 and through a heat exchanger 56 where further heat energy is imparted to the compressed air from the exhaust system duct 58 of the fuel-burning section of the turbine, as will be presently discussed. This compressed air at elevated temperature then passes through the duct 60 and into the intake of the combustion chamber of the fuel burning portion of the turbine.

The fuel burning portion of the turbine comprises a rotor housing 62 which surrounds a fuel burning rotor 64 which is mounted on the shaft 22 and rotates in unison with the rotating members 24 and 27 of the first and second radial compressor stages 18 and 20. The rotor 64 drives these compressor stages and the shaft 22, and power take-off from the turbine system in general is accomplished by connection of appropriate gearing to the splines 23 of the shaft 22 at the right-hand end thereof as shown in FIG. 1.

The fuel is burned inside of the rotor 64 and is furnished by the fuel pump 66 which delivers a slurry comprising a mixture of finely divided coal and alcohol, and perhaps some water added to this slurry. The slurry is pumped through a fuel pressure regulator 67 and through fuel lines 68 into the fuel injector 70, through its hollow shaft 72, and is sprayed from the injection head nozzle 74 into the combustion chamber which comprises the sleeve 76. The fuel is ignited by electrical igniters 96 which will be discussed hereinafter in connection with the detailed injector description relating to FIG. 4. The high temperature gases resulting from the burning of the fuel within the combustion chamber 76 expand in the right-hand axial direction, impinge against the diverter 78 and are thrown outwardly so that they then pass through the reaction rotor jet orifice tubes 80 outwardly into the rotor housing 62, where the exhaust gases are collected and passed through the exhaust duct 58, the heat exchanger 56, and then exit through the final exhaust discharge duct 59, which may be coupled to any external system as may be desired for retriving the energy remaining in the hot exhaust gases.

As stated above, the torque which is generated by the rotor 64 is attributable to the reaction of the exhaust gases passing through the orifices 80 which are located around the periphery of the rotor 64, and this torque applied to the shaft 22 is proportional to the sum of the reaction force thrusts at the orifices multiplied by the radius from the center of the shaft 22 to an orifice 80.

Turning now from the general description of the turbine as a whole to more specific features thereof, the fuel-burning portion of the turbine embodying the novel features which are claimed in this invention will now be described with reference to FIGS. 1, 2, 3 and 4.

The rotor 64 includes a torque disc portion 82 which is secured to a hub 25 comprising an integral portion of the shaft 22. The rotor further comprises an orifice supporting ring 84, FIG. 3, having a stepped peripheral surface in which jet orifice tubes 85 are mounted at equally spaced intervals around the periphery, the orifice tubes facing in substantially circumferential directions. The ring is provided in the vicinity of each step with a tube receiving bore 80 having a threaded engagement between bore 80 and tube 85. The ring 84 has a series of holes 83 through which bolts 81 are passed for the purpose of bolting together the torque disc 82, the orifice supporting ring 84, and the conical portion 86 of the rotor, FIG. 2. The conical portion 86 is joined to a chamber housing 88, which is in turn supported on bearings B cradled in the frame members 14 as can be seen best in FIG. 1. It is to be understood that the various bearings B which are illustrated to support the shaft 22 and the chamber housing 88 are also provided with appropriate seals S. The members 82, 84, 86 and 88 all rotate in unison, being supported at one end by the shaft 22 and its bearings and being supported at the other end by the chamber housing 88 and its supporting bearings. The combustion chamber 76 is supported by appropriate spacers within the chamber housing 88 and it rotates with the housing.

On the other hand, the injector assembly 70, 72 and 74 is bolted to the housing portion 61 where the heated and compressed air is inducted for burning within the rotor 64. The injector assembly does not rotate with the rotor. It extends through the chamber housing 88 and terminates at its inner end in a fuel injection head 74 which is located in the combustion chamber 76 as will be described in connection with FIG. 4.

Figure 4:
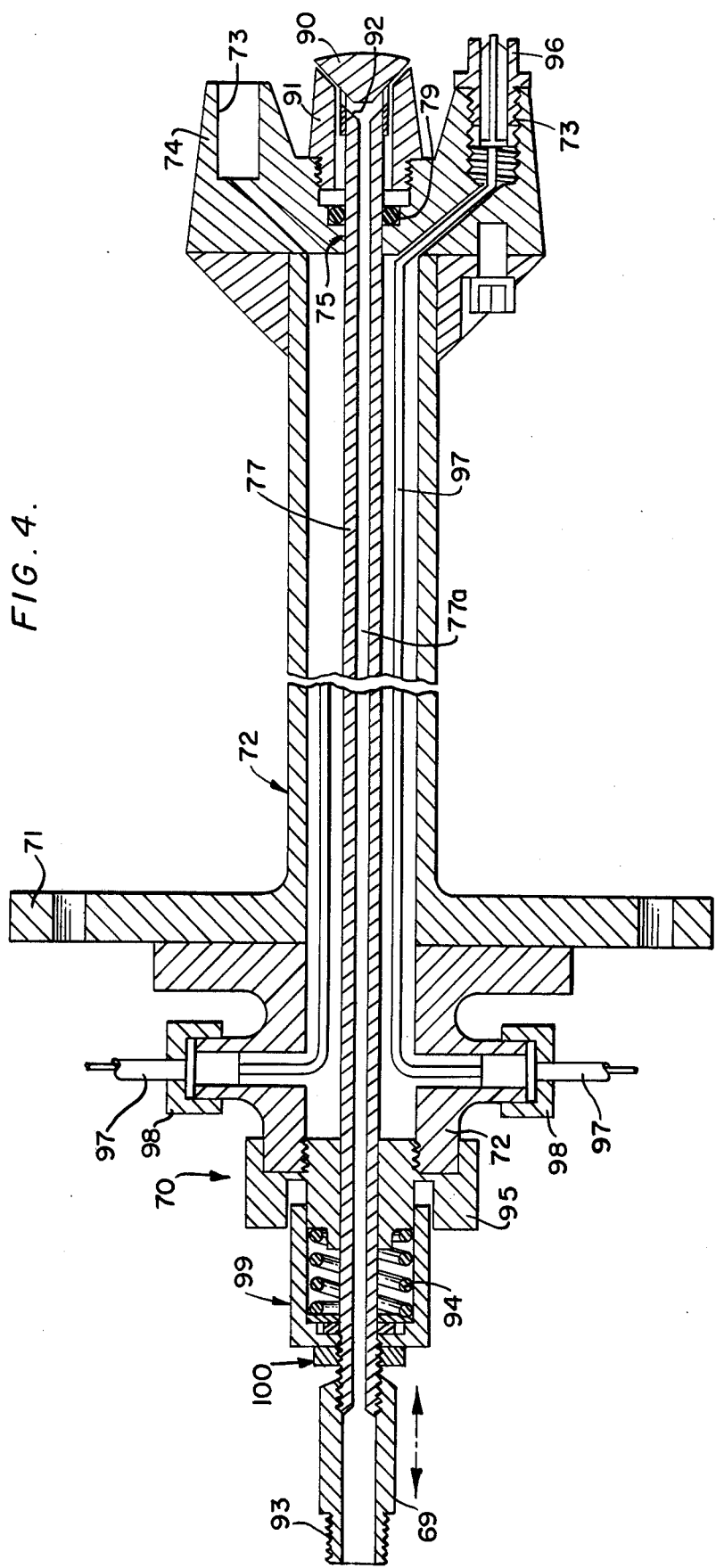
FIG. 4 is an enlarged cross-sectional view taken through the fuel injector serving to inject slurry fuel into the combustion chamber of the reaction rotor.

The fuel slurry is pumped into the injector assembly 70 using a conventional vane pump 66 as shown in FIG. 1, the fuel then being metered by a metering device 67, and passed through the flexible fuel line 68 into the inlet end 69 of the fuel injector assembly, which can be seen best in FIG. 4. The fuel passes through the injector assembly 70 and is discharged into the inner combustion chamber 76 through the head 74. The details of the injection using this ignitor system will be discussed hereinafter.

Figure 3:
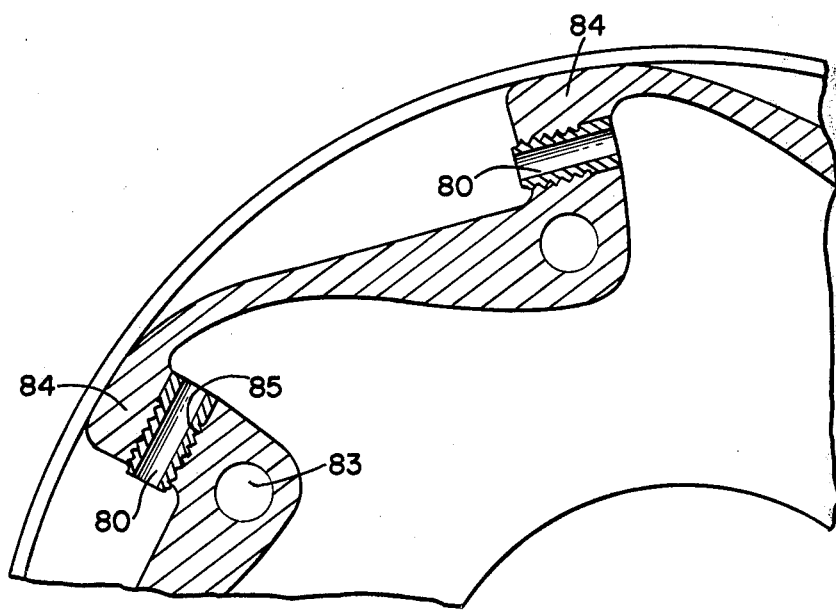
FIG. 3 is a detailed sectional view through a portion of the rotor's periphery showing the structure of the ring which supports the jet orifice tubes.

The reaction rotor fuel-burning portion of the turbine is believed to be an improvement both with regard to its mechanical construction and with regard to its thermodynamic operation, as compared with known axial and radial expander type power rotors. Mechanically, the reaction rotor comprises four separable parts 82, 84, 86 and 88, and the jet orifice tubes 85 which are carried by the ring 84. These jet tubes can be either of constant diameter as shown in FIG. 3 or they can be convergent-divergent Venturi-type nozzles, or they can be divergent jet nozzles. In any event, the axes of these tubes make an angle of about 90° with respect to the radii of the rotor. The tubes 85 are constructed of tugsten carbide or similar erosion and heat resistant materials, and various parameters determine their internal diameters, these parameters including the total number of jet tubes used, the working pressure of the gases in the rotor, the specific heat of the working gases, and the r.p.m. of the rotor as well as its working diameter. Other factors of concern are the exact angle of placement of the internal axis of each of the jets with respect to the radii of the rotor, and the exhaust back pressure of spent gases discharging through the ducts 58 and 59.

The diverter plate 78 is positioned axially within the rotor to deflect hot gases toward the jet tubes 85 and for the purpose of protecting the end of the shaft 22 from conducting an excessive amount of heat energy. The members 78, 82, 84, 86 and 88 are all constructed of selected alloy steels having structural strength suitable at elevated temperatures and pressures and at high centrifugal forces occurring at high r.p.m. ranges. A suitable r.p.m. range extends from about 25,000 r.p.m. to about 35,000 r.p.m. The construction of these parts with carefully selected steels will provide erosion resistance to solid-particle abrasion, as well as the necessary strength to prevent bursting at elevated temperatures. High efficiency of the turbine is further attributable to thermodynamic principles whereby one is able to reduce the inlet air compressor power consumed because of the use of a smaller mass flow through the rotor, and a higher pressure ratio of gases in the rotor at this reduced mass flow, and because most of the enthalpy drop occurs within and outside of the jet orifice tubes of the rotating power rotor, instead of being divided about equally between stationary and moving blades as occurs in an impulse type turbine. The reaction rotor is suitably streamlined to reduce friction losses. Raising the working pressure in the turbine increases the thermal efficiency with the result that for a specific size of a power turbine the total mass of air flowing over a given time can be reduced, without reducing the power generated by the power turbine. A lessened mass flow in the compressor section requires less power taken from the turbine by virtue of the reduced work of compression minus the work necessary to increase the pressure ratio, considering also the reduced power loss incurred by intercooling between stages and heat regeneration after final compression due to the reduced mass flow.

Further improvement in the turbine resides in the structure of the rotating combustion housing 88 and the internal combustion chamber 76, which contribute to the efficient operation of the fuel burning portion of the turbine. The chamber housing 88 comprises in effect a hollow elongated cylindrical shaft containing the combustion chamber 76. The combustion chamber 76 has been carefully designed as to shape so that its convergent-divergent-Venturi portion is provided with spaced air inlet holes 76a providing easy entrance of the air from the air inlet housing 61. These holes 76a also provide for the escape of ash from within the combustion chamber 76 so that it will not build up therein. The combustion chamber is Venturi shaped with air inlet holes so placed at the neck of the Venturi as to assure extra air entry at that point for further mixing of the cooling air and combustion products so that a more uniform temperature is reached as the mixture passes into the rotor. The total quantity of air is 4 to 5 times the amount needed for stoichiometric combustion. The Venturi effect provides for a very slight internal pressure drop at the neck and therefore the air is drawn from the outside to the inside of the rotating combustion chamber. The heated and compressed air which burns the fuel issuing from the injection head 74 enters the combustion portion of the turbine through the outer housing 61, extends through the chamber housing 88, and flows around the outside of the combustion chamber 76 and enters the same through the holes 76a passing therethrough. The internal design of the hub and rotor used known aerodynamic principles, that is to provide a passageway for air and combustion gases with the least internal friction and obstruction. The rotor is constructed with the rim offset from the center at a large angle to avoid a sharp turn and deflection of the gases which would create turbulence and excessive skin friction. All passageways are of sufficient area to keep frictional losses to minimum. The use of stainless steel and internal polishing further reduces skin friction and air drag in the hub and rotor. Thermodynamically this design and construction is important as the constant pressure drop and increasing volumes and temperatures create successive pressure drops. One of the most important thermodynamic improvements is achieved by limiting the number of jet orifices in the rotor perimeter to a low number, placed in a single row. By so doing the effect of exhaust gas interference and collision is counteracted to a large extent, and permitting the jetted gases to flow into an exhaust chamber 62 where the pressure is quite low.

The injector through which the fuel is entered into the combustion chamber within the reaction rotor is best illustrated in FIG. 4. The injector is generally referred to by the reference character 70 and further comprises a mounting flange 71 which is secured to the air inlet housing 61. This flange also supports the outer tubular portion 72 of the injector which tubular portion in turn supports the nozzle head 74 which has axially disposed openings 73 for the purpose hereinafter stated. The nozzle head 74 also has an axial opening 75 therein through which extends the hollow control rod 77 which passes through an O-ring seal 79 supported in a groove in the head 74. The discharge end of the hollow control rod 77 terminates just short of a movable conical valve head 90 which is supported by the rod 77 in spaced relation with respect to a conical spray member 91 which is fixed in the head 74, as by threaded engagement. The control rod 77 has openings 92 adjacent the conical valve head 90 and disposed so that the fuel from the bore 77a can pass outwardly therethrough. When the control rod 77 is moved toward the left in the head 74 the conical portions of the members 90 and 91 will close toward mating position so as to reduce the flow of fuel through the hollow bore 77a of the control rod and out through the passage 92 between the members 90 and 91. The other end of the control rod 77 has a screw fitting 69 threaded at 93 which receives the flexible fuel line 68 by which fuel is passed down through the bore 77a in the control rod 77. The control rod is urged leftwardly by the spring 94 which is housed within a hollow member 99 which slides within a stationary nut 95 which is screwed on to the tubular housing 72 as shown in FIG. 4. The spring urges the control rod 77 in a leftward direction to close the conical valve tip 91 against the conical valve head 90 and reduce or cut-off the flow of fuel through the control rod and out through the injector nozzle. However, the pressure of the fuel in the bore of the control rod opposes the action of the spring 94, which can be adjusted by turning the nut 100, and tends to shift the control rod rightwardly to increase the fuel flow. The pressure of the fuel, therefore, as controlled by the regulator 67 determines the opening of the injector head and therefore the amount of fuel injected into the combustion chamber 76.

The injector is provided with two glow plug igniters 96 which are mounted in the boxes 73 of the nozzle head 74 and are connected by electric wires 97 which are brought out of the nozzle housing through sealing nuts 98 and are connected to a suitable source of electrical power such as a rectifier system or a battery. The glow plugs 96 ignite the fuel within the combustion chamber 76 so as to cause the flowing fuel to burn continuously within the rotor. High velocity of the fuel through the small diameter bore 77a in the control rod 77 prevents caking of the fuel, and the spring 94 both modulates fuel injection rate according to the pressure supplied by the regulator 67, and also compensates for thermal expansion and contraction in the control rod 77 during operation.

The main shaft 22 and the chamber housing 88 are supported on journal bearings B which are of the alloy faced type and which are lubricated and cooled by oil under pressure which is stored in a tank (not shown) in the frame of the turbine. The journal bearings are carried by the frame members 14 and 16 which are in turn supported on the main frame 10. The turbine is also provided with oil pressurized labyrinth seals S which are located on opposite sides of the bearings B, and are also located between the second radial compressor 20 and the reaction rotor mounting flange 25.

The two compressor rotors have their intakes faced in opposite axial directions so that their end thrust components will tend to cancel out about the doublefaced thrust bearing B which is located between them. The selection of alloys and the locations of the bearings are such as to allow for any expansion or contraction of the power rotor and the parts attached to it in the process of its use.

During typical operation of the turbine, the pressure drop across the rotor approximates the input compressed air pressure. There is, of course, a constant pressure drop from the head exchanger, through the rotor hub, through and around the combustion chamber sleeve 76, in the rotor and through the orifice tubes and into the atmosphere. With lowering operating pressures and constantly expanding volume in each succeeding unit, flow occurs in only one direction in a constant manner, from a higher pressure to a lower pressure. This can best be illustrated by citing typical pressures and temperatures progressively. Air leaves the second stage compressor stage 20 at 275 psig and 375° F, enters the heat exchanger 56 and leaves at 255 psig and 525° F, enters the rotor hub 88 at 250 psig and 500° F. Approximately 30% of the air enters the combustion chamber sleeve 76 where it is heated to 2800° to 3000° by combustion, and mixes with the 70% remaining cooler air and expands into the rotor at 200 psig and 1500° F with a large increase in volume. Expansion through the orifice tubes 85 drops the pressure to 1 psig and 700° F. The total pressure drop through the turbine is mainly controlled by the number and internal diameters of the orifice tubes; and to a small degree by the frictional losses in all passages.

The present invention is not to be limited to the exact form shown in the drawings, for obviously changes may be made within the following claims.

I claim:
1. A reaction turbine for burning solid particulate fuels in slurry form delivered to the turbine from a fuel pressure regulator, and for discharging the resulting ash from the turbine to prevent accumulation therein, comprising:
   a. a frame having axially spaced journal supports and having a shaft journaled therein and supporting rotary air compressor means delivering air under pressure to an air intake housing adjacent one of the journal supports;
   b. a fuel burning rotor having an annular peripheral portion and having a first-end portion extending radially outwardly from the shaft to the peripheral portion, and having a second end portion fixed to the peripheral portion and having a central opening therethrough, the diameter of said peripheral portion being large as compared with the axial length of the rotor between said end portions;
   c. an annular series of jet orifices extending through said annular portion and spaced thereabout and each oriented substantially normal to a radius of the rotor intersecting the orifice;
   d. a chamber housing having one end fixed to said second end portion and communicating smoothly into said rotor thereat, and having its other end supported by journals at said one journal support and communicating with said air intake housing to receive compressed air;
   e. a fuel injector connected with said regulator and extending through said intake housing and axially through said other end of the chamber housing and having a nozzle facing into the housing operative to spray fuel thereinto;
   f. a combustion chamber sleeve in said chamber housing mounted concentrically therein in spaced relationship to the chamber housing and supported to rotate therewith, the combustion chamber sleeve being longer than its diameter and terminating at one end which is necked down to closely fit around the nozzle while leaving an airspace therebetween, and the other end of the sleeve being Venturi shaped and extending beyond said second end portion and flairing into the rotor; the intake air being divided so that a smaller portion of it passes into the sleeve through said airspace and a larger portion of it passes into the rotor by passing between the sleeve and the chamber housing; and
   g. a solid particle fuel in slurry form, and means to ignite the fuel sprayed from the nozzle.

2. In a turbine set forth in claim 1, said peripheral portion of the rotor comprising a ring having a crosssection including a radially disposed step portion at each orifice, the radially disposed portions each having a hole therethrough disposed substantially normal to a radius of the ring at the stepped location, and an orifice tube in each hole, and the end portions of the rotor converging toward said ring so as to reduce the axial length of the rotor from its axis toward said ring.

3. In a turbine as set forth in claim 1, an exhaust collecting housing around said rotor; a heat exchanger having a path for receiving exhaust from said exhaust housing and having another path connected between said air compressor means and said air intake housing, for heating the air under pressure as it is delivered to the combustion chamber housing.

4. In a turbine as set forth in claim 1, said Venturi-shaped combustion chamber sleeve having spaced holes therethrough for admitting air thereinto from said chamber housing and for allowing solid particles and ash to be slung outwardly therefrom and entrained into the stream of air passing from the chamber housing into the rotor.

5. In a turbine as set forth in claim 1, said fuel injector comprising an elongated casing extending through the air intake housing and into said combustion chamber sleeve, the casing having a hollow rod extending therethrough and the fuel regulator being connected to the outer end of the rod, the fuel nozzle being located at the inner end of the rod to receive fuel entering therethrough, the nozzle being supported by the casing, a valve member at the inner end of the rod seatable against said nozzle to restrict it, and adjustable spring means operative to yieldably urge the rod toward the nozzle tending to close it against the opposing pressure of the fuel which tends to open it thereby to restrict the flow of fuel from said bore through the nozzle.

6. In a turbine as set forth in claim 5, said injector having a head portion at its inner end extending into said combustion chamber sleeve and including said nozzle, and electric fuel ignitors carried by said head and spaced about said nozzle in the path of the sprayed fuel, the air axially entering the sleeve through said airspace between the nozzle and the sleeve under pressure and the nozzle being operative to spray the fuel directly into the path of the axially entering air.

* * * * *